(12) United States Patent
von Hellens

(10) Patent No.: US 6,407,153 B1
(45) Date of Patent: Jun. 18, 2002

(54) SILICA-CONTAINING RUBBER COMPOSITIONS

(75) Inventor: Carl Walter von Hellens, Bright's Grove (CA)

(73) Assignee: Bayer Inc., Sarnia (CA)

( * ) Notice: Subject to any disclaimer, the term of this patent is extended or adjusted under 35 U.S.C. 154(b) by 0 days.

(21) Appl. No.: 09/508,786

(22) PCT Filed: Aug. 11, 1998

(86) PCT No.: PCT/CA98/00767

§ 371 (c)(1),
(2), (4) Date: Mar. 16, 2000

(87) PCT Pub. No.: WO99/15583

PCT Pub. Date: Apr. 1, 1999

(30) Foreign Application Priority Data

Sep. 19, 1997 (CA) .............................................. 2216062

(51) Int. Cl.[7] .................................................. C08J 5/16
(52) U.S. Cl. ........................................ 524/188; 524/575
(58) Field of Search ................................... 524/188, 575

(56) References Cited

U.S. PATENT DOCUMENTS 3,691,129 A * 9/1972 Burke ........................ 260/33.6
3,700,690 A   10/1972 Burke, Jr. ............. 260/33.6 AO
4,278,587 A * 7/1981 Wolff et al. ............... 260/42.37
5,227,425 A   7/1993 Rauline ....................... 524/493
5,663,226 A   9/1997 Scholl et al. ................ 524/262

FOREIGN PATENT DOCUMENTS

DE    4435311    4/1996
GB    1140687    1/1969

OTHER PUBLICATIONS

Ullmann's Encyclopedia of Industrial Chem. vol. A23, (month unavailable) 1993, pp. 642–644, Silica.

* cited by examiner

Primary Examiner—David W. Wu
Assistant Examiner—William K Cheung
(74) Attorney, Agent, or Firm—Joseph C. Gil; Noland J. Cheung; Jennifer R. Seng

(57) ABSTRACT

The invention relates to an elastoemeric composition which comprises: (I) a vinyl solution SBR/silica-containing masterbatch, which contains preferably from 40 to 120 parts by weight of silica per 100 parts by weight of polymer, and (ii) a high cis polybutadiene/silica-containing masterbatch, which contains preferably from 40 to 120 parts by weight of silica per 100 parts by weight of polymer wherein silica has been hydrophobicized.

24 Claims, No Drawings

SILICA-CONTAINING RUBBER COMPOSITIONS

TECHNICAL FIELD

The present invention relates to elastomeric compositions containing hydrophobicized silica. Elastomeric compositions of the invention are suitable, for example, for the manufacture of tires, tire tread, hose, industrial drive belts, conveyor belts and shoe soles.

BACKGROUND ART

In recent years, there has developed a considerable interest in silica reinforced tires, particularly since the appearance in 1992 of the Groupe Michelin (G-M) patents (EP 05 01 227 A 1; AU-A-111 77 192) indicating that tires made with tread formulations incorporating silica enjoy some important performance advantages over those based on conventional carbon black filler. Improvements are claimed for this "Green Tire" in the areas of (a) lower rolling resistance, (b) better traction on snow and (c) lower noise generation, when compared with conventional tires filled with carbon black.

Rubber for tires is often supplied by a rubber producer to a tire manufacturer in the form of a masterbatch containing an elastomer, which is typically a hydrocarbon rubber, an oil extender and a filler. The traditional filler has been carbon black in the form of fine particles. These particles have hydrophobic surface characteristics and will therefore disperse easily within the hydrophobic elastomer. In contrast, silica has a very hydrophilic surface and considerable difficulty has been encountered in dispersing silica in the hydrophobic rubber elastomer.

In the past, efforts have been made to make masterbatches from elastomer dispersions and aqueous dispersions of silica pigment, such as those referred to and attempted by Burke, in U.S. Pat. No. 3,700,690. Burke attempted to overcome the previously known difficulties of incorporating fine particles of silica uniformly into a masterbatch. At the time of the Burke invention, there was no known elastomer-silica masterbatch offered in the commercial market. Similarly today, to the Applicant's knowledge, there are no commercially available in situ produced elastomer-silica masterbatches in the market, despite the efforts of Burke (i.e., conventional elastomer-silica masterbatches are produced and available in the dry state).

SUMMARY OF THE INVENTION

It is an object of the present invention to obviate or mitigate at least one of the above-mentioned disadvantages of the prior art.

It is another object of the present invention to provide a novel masterbatch composition.

Thus, in one of its aspects, the present invention provides a rubber masterbatch composition comprising a solution SBR (styrene-butadiene rubber) and silica particles.

In one embodiment, the solution SBR may be a low vinyl, low styrene solution SBR. In another embodiment, the solution SSR may comprise a mixture of a solution SBR (i.e., virtually any solution SBR) and solution BR (butadiene rubber).

In another of its aspects, the present invention provides an elastomeric composition which comprises:

(i) a solution SBR/silica-containing masterbatch, which contains preferably from about 40 to about 120 parts by weight of silica per 100 parts by weight of polymer, and (ii) a solution BR/silica-containing masterbatch, which contains preferably from about 40 to about 120 parts by weight of silica per 100 parts by weight of polymer; wherein the silica has been hydrophobicized.

The present compositions may be characterized, inter alia, by being useful in the production of vulcanizates have an improvement in one or more of the following properties: traction, abrasion and rolling resistance.

DESCRIPTION OF THE PREFERRED EMBODIMENTS

As used throughout this specification, the term "solution SBR" is intended to mean a styrene-butadiene rubber produced by a process in which polymerization of the styrene and butadiene monomers is catalyzed in the presence of a solvent (typically a hydrocarbon solvent). The solution SBR typically has a glass transition temperature (Tg) of between 0° C. and −80° C., when measured by differential scanning calorimeter.

As disclosed hereinabove, in one embodiment of the present invention, the solution SBR may be a single elastomer in the form of a low-vinyl, low styrene solution SBR. The term "low vinyl, low styrene solution SBR", as used throughout this specification, is meant to encompass a solution SBR having a vinyl content of less than about 40% (preferably in the range of from about 5 to about 40%, more preferably in the range of from about 5 to about 30%, most preferably in the range of from about 5 to about 25%) and a styrene content in the range of from about 5 to about 25% (preferably in the range of from about 10 to about 25%, most preferably in the range of from about 15 to about 25%). In this embodiment, the composition comprises a masterbatch of the low vinyl, low styrene solution SBR and the silica particles.

As further disclosed hereinabove, in another embodiment of the present invention, the solution SBR may comprise a mixture of a solution SBR and a solution BR. In a first version of this embodiment, the composition comprises a mixture of a first masterbatch comprising solution SBR/silica particles and a second masterbatch comprising solution BR/silica particles. In a second version of this embodiment, the composition comprises a single masterbatch derived from a mixture of polymer cements—i.e., a mixture of solution SBR and solution BR cements is first made and then contacted with the silica particles to produce the masterbatch.

The solution SBR may be suitably prepared in solution and may have a styrene content in the range of from about 15 to about 25% by weight and a glass transition temperature (Tg) of between 0° C. and −80° C., when measured by differential scanning calorimeter. The content of vinyl bonds in the butadiene fraction incorporated can be in the range of from about 30 to about 75%, preferably in the range of from about 50 to about 75%. The content of trans-1,4 bonds can be between 15 and 60%, and the content of cis 1,4 bonds is complementary to the content of vinyl bonds plus trans-1,4 bonds. The vinyl bonds content of the copolymer is preferably greater than 50%. Particularly preferred is Buna VSL 5025-1 (formerly Buna VSL 1950S25, commercially available from Bayer Inc.) which is a co-polymer of styrene and butadiene, the styrene content being about 25% and the vinyl content in the butadiene portion being about 67%.

As used throughout this specification, the term "solution BR" is intended to mean a butadiene rubber produced by a process in which polymerization of the butadiene monomer is catalyzed in the presence of a solvent (typically a hydrocarbon solvent). Preferably, the solution BR is a high cis polybutadiene, more preferably a solution BR having more than 90% cis-1,4 bonds. The production of such a solution BR can be achieved by known methods of catalysis with the use of transition metals as described, for instance in French Patent No. 143 6607. A particularly preferred solution BR is Taktene 1203 (available from Bayer), which has a cis content of about 96%.

The composition preferably contains from about 30 to about 100 parts per 100 parts of total polymer (phr) of silica. Preferably it also contains from about 25 to about 50 parts per 100 parts of total polymer (phr) of aromatic oil, selected from those known in rubber processing.

As stated above, the silica particles are hydrophobicized. A preferred method for hydrophobicizing silica particles is described in copending International patent application PCT/CA98/00499, the contents of which are hereby incorporated by reference. This preferred process comprises the steps of:

(a) contacting the particles with a compound of Formula I:

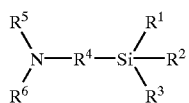

(I)

or an acid addition or quaternary ammonium salt thereof, in which:
at least one of $R^1$, $R^2$ and $R^3$, preferably two of $R^1$, $R^2$ and $R^3$ and most preferably $R^1$, $R^2$ and $R^3$ are hydroxyl or hydrolysable groups;
$R^4$ is a divalent group that is resistant to hydrolysis at the Si—$R^4$ bond;
$R^5$ is selected from the group comprising: hydrogen; a $C_{1-40}$ alkyl; a $C_{2-40}$ mono-, di- or tri-unsaturated alkenyl group; a $C_6$–$C_{40}$ aryl group; a group of the formula:

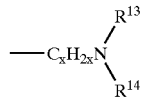

in which x is an integer from 2 to 10, $R^{13}$ and $R^{14}$, which may be the same or different, are each hydrogen; $C_{1-18}$ alky; $C_{2-18}$, mono-, di- or tri-unsaturated alkenyl; phenyl; a group of formula:

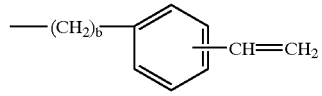

wherein b is an integer from 1 to 10; a group of formula:

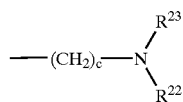

wherein c is an integer from 1 to 10 and $R^{22}$ and $R^{23}$ which may be the same or different, are each hydrogen, $C_{1-10}$ alkyl group or $C_{2-10}$ alkenyl group, provided that there is no double bond in the position alpha to the nitrogen atom; a group of formula:

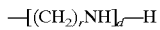

wherein r is an integer from 1 to 6 and d is an integer from 1 to 4;
$R^6$ may be any of the groups defined for $R^5$, or $R^5$ and $R^6$ may together form a divalent group of formula:

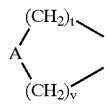

in which A is selected from the group comprising —CHR or —NR group in which R is hydrogen or a $C_{1-40}$ alkyl or $C_{2-40}$ alkeny. group, a $C_6$–$C_{40}$ aryl group, an oxygen atom and a sulfur atom, and t and v are each independently 1, 2, 3 or 4; provided that the sum of t and v does not exceed 6, and is preferably 4; and (b) contacting the particles with a compound of the Formula II:

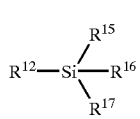

(II)

in which:
$R^{15}$, $R^{16}$ and $R^{17}$ have the same definitions as $R^1$, $R^2$ and $R^3$; and
$R^{12}$ is selected from the group comprising a $C_{8-40}$ alkyl group or a $C_{8-40}$ mono-, di- or tri-unsaturated alkenyl group, either of which can be interrupted by one or more aryl groups, preferably phenyl groups; a group of formula:

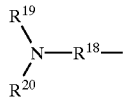

or an acid addition or quaternary ammonium salt thereof in which $R^{18}$ is a divalent group resistant to hydrolysis at the Si—$R^{18}$ bond, $R^{19}$ is selected from the group comprising hydrogen, a $C_{1-40}$ alkyl group, a $C_{2-40}$ mono-, di- or tri-unsaturated alkenyl group, a substituted aromatic group, for example the phenylene group —($C_6H_4$)—, the biphenylene group —($C_6H_4$)—($C_6H_4$)—, the —($C_6H_4$)—O—($C_6H_4$)— group or the naphthylene group, —($C_{10}H_6$)—, the aromatic group being unsubstitued or substituted by a $C_{1-20}$ alkyl or $C_{2-20}$ mono-, di- or tri-unsaturated alkenyl group; and $R^{20}$ may be any of the groups defined for $R^{19}$, with the provisos that $R^{19}$ and $R^{20}$ do not have a tertiary carbon atom adjacent to the nitrogen atom and that at least one of $R^{19}$ and $R^{20}$ has a carbon chain at least 8 carbon atoms in length uninterrupted by any heteroatoms.

Preferably, $R^{18}$ is a $C_1$–$C_{40}$ saturated or unsaturated group (e.g., alkenyl, aryl, cycloalkyl and the like).

In the process, Steps (a) and (b) may be conducted concurrently or sequentially. If Steps (a) and (b) are conducted sequentially, it is preferred to conduct Step (a) followed by Step (b).

As will be apparent to those of skill in the art, there are instances where Formulae I and II may be the same compound—e.g., when $R^5$=$R^{19}$= a $C_{8-40}$ alkyl group or $R^5=R^{19}=$ a $C_{8-40}$ mono-, di- or tri-unsaturated alkenyl group. Thus, in such cases where Formulae I and II are the same compound, it will be clearly understood that the process intentionally embodies a single step process (i.e., where the compound of Formulae I and II is added in a single step) and a multi-step process (i.e., where the compound of Formulae I and II is added proportionally in two or more steps).

Preferably, the process is carried out in an aqueous solution, dispersion or slurry, so that the product of the process is an aqueous dispersion or slurry of hydrophobicized mineral particles.

In one preferred embodiment, the dispersion or slurry resulting from the process, and containing the treated particles (preferably mineral particles such as silica), is then mixed with a hydrocarbon solution of the elastomer (i.e., low vinyl, low styrene solution SBR, solution SBR or solution BR), and then dried to form a silica-filled rubber masterbatch. Owing to the hydrophobicized nature of the silica filler, it is well dispersed in the elastomer. This preferred embodiment results in the in situ production of a masterbatch composition comprising the elastomer and the treated particles. By "in situ production" is meant that treated particles are incorporated into a masterbatch composition without being isolated (i.e., separated from the dispersion or slurry, and subsequently dried). This preferred embodiment is believed to be the first in situ production of a masterbatch composition comprising solution SBR and a treated particulate material such as silica.

In a preferred embodiment, the treatment is carried out in an aqueous dispersion or slurry and the concentration of the aqueous dispersion or slurry of silica particles may be between 1 and 30 percent by weight of silica in water, preferably between 5 and 25 percent by weight of silica in water and most preferably between 8 and 22 percent by weight of silica in water. Dried amorphous silica suitable for use in accordance with the invention may have a mean agglomerate particle size between 1 and 100 microns, preferably between 10 and 50 microns and most preferably between 10 and 25 microns. It is preferred that less than 10 percent by volume of the agglomerate particles are below 5 microns or over 50 microns in size. A suitable amorphous dried silica moreover has a BET surface area, measured in accordance with DIN (Deutsche Industrie Norm) 66131, of between 50 and 450 square meters per gram and a DBP absorption, as measured in accordance with DIN 53601, of between 150 and 400 grams per 100 grams of silica, and a drying loss, as measured according to DIN ISO 787/II, of from 0 to 10 percent by weight. If filter cake is used, it may be made by any known means such as described in Ullmann's Encyclopedia of Industrial Chemical Vol A23 pages 642–643, VCH Publishers, ©1993. The filter cake has a preferred solids content of between 5 and 30 percent by weight, most preferably between 15 and 25 percent by weight, and it may be redispersed in water in accordance with the process to give a silica concentration of between 5 and 20 percent by weight and most preferably between 8 and 12 percent by weight. It is preferred to use a filter cake.

If a never-filtered slurry prepared from the known reaction of a solution of alkali metal silicate with either mineral acid or carbon dioxide is used, it is preferred that the solids content of the never-filtered slurry be between 1 and 30, more preferably between 5 and 10, percent by weight of silica. The slurry temperature may be between 0 and 100 degrees Celsius if the process is conducted at atmospheric pressure or between 0 and 135 degrees Celsius if the operation is conducted in a pressure vessel. Most preferably, the process is conducted at atmospheric pressure in which case the preferred temperature is between 30 and 95 degrees Celsius and most preferably between 45 and 90 degrees Celsius.

It is desirable that, prior to the addition to the silica particles of the compound of Formula I, the dispersion or slurry shall have a pH in the range from 6 to about 8, more preferably from about 6.8 to about 7.2. If necessary, the pH can be adjusted by addition of acid or alkali, for example mineral acid, alkali metal hydroxide, alkaline earth hydroxide, ammonium hydroxide and the like. These can be added as such or in aqueous solution.

In the compound of Formula I, it is preferred that all three of the groups $R^1$, $R^2$ and $R^3$ are readily hydrolysable. Suitable groups $R^1$ include hydroxyl groups and hydrolysable groups of formula $OC_pH_{2p}+1$ where p has a value from 1 to 10. The alkyl chain can be interrupted by oxygen atoms, to give groups, for example, of formula $CH_3OCH_2O-$, $CH_3OCH_2OCH_2O-$, $CH_3(OCH_2)_4O-$, $CH_3OCH_2CH_2O-$, $C_2H_5OCH_2O-$, $C_2H_5OCH_2OCH_2O-$, or $C_2H_5OCH_2CH_2O-$. Other suitable hydrolysable groups include phenoxy, acetoxy, chloro, bromo, iodo, ONa, OLi, OK or amino or mono- or dialkylamino, wherein the alkyl group(s) have 1 to 30 carbon atoms.

$R^2$ and $R^3$ can take the same values as $R^1$, provided that only one of $R^1$, $R^2$ and $R^3$ is chloro, bromo or iodo. Preferably, only one or two of $R^1$, $R^2$ and $R^3$ is hydroxyl or ONa, OLi or OK.

Non-limiting examples of groups $R^2$ and $R^3$ that are not hydrolysable include $C_{1-10}$ alkyl, $C_{2-10}$ mono- or diunsaturated alkenyl, and phenyl. $R^2$ and $R^3$ can also each be a group $-R^4-NR^5R^6$, discussed further below. It is preferred that $R^1$, $R^2$ and $R^3$ are all the same and are $CH_3O-$, $C_2H_5O-$ or $C_3H_8O-$. Most preferably they are all $CH_3O-$.

The divalent group $R^4$ is preferably such that $N-R^4-Si$ is of the formula:

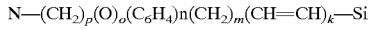

$$N-(CH_2)_p(O)_o(C_6H_4)n(CH_2)_m(CH=CH)_k-Si$$

in which k, m, n, o and p are all whole numbers. The order of the moieties between N and Si is not particularly restricted other than neither N or O should be directly bound to Si. The value of k is 0 or 1, the value of m is from 0 to 20 inclusive, the value of n is 0, 1 or 2, the value of o is 0 or 1 and the value of p is from 0 to 20 inclusive, with the provisos that the sum of the values of k, m, n, o and p is at least 1 and not more than 20 and that if o is 1, p is 1 or greater and the sum of k, m and n is 1 or greater, i.e. that the Si atom is linked directly to a carbon atom. There should be no hydrolysable bond between the silicon and nitrogen atoms. Preferably, m is 3 and l, n, o and p are all 0, i.e., $R^4$ is $-CH_2CH_2CH_2-$.

The group $R^5$ is preferably a $C_{8-20}$ monounsaturated alkenyl group, most preferably a $C_{16-18}$ monounsaturated alkenyl group. $R^6$ is preferably hydrogen.

Suitable compounds of Formula I include, but are not limited to: 3-aminopropylmethyldiethoxysilane, N-2-(vinylbenzylamino)-ethyl-3-aminopropyl-trimetoxysilane, N-(2-aminoethyl)-3-aminopropyltrimethoxy-silane, trimethoxysilylpropyldiethylenetriamine, N-2-(aminoethyl)-3-aminopropyltris(2-ethylhexoxy)silane, 3-aminopropyldiisopropylethoxysilane, N-(6-aminohexyl) aminopropyltrimethoxysilane, 4-aminobutyltriethoxysilane, 4-aminobutyldimethylmethoxysilane, triethoxysilylpropyl-diethylenetriamine, 3-aminopropyltris (methoxyethoxyethoxy)silane, N-(2-aminoethyl)-3- aminopropyltrimethoxysilane, N-2-(aminoethyl)-3-aminopropyltris(2-ethylhexoxy)silane, 3-aminopropyldiisopropylethoxysilane, N-(6-aminohexyl) aminopropyltrimethoxysilane, 4-aminobutyltriethoxysilane, and (cyclohexylaminomethyl)-methyidiethoxysilane.

Preferred compounds of Formula I include those in which $R^5$ is hydrogen and $R^6$ is the alkenyl group from the following: soya alkyl, tall oil alkyl, stearyl, tallow alkyl, dihydrogenated tallow alkyl, cocoalkyl, rosin alkyl, and palmityl, it being understood that in this case the alkyl may include unsaturation.

It is preferred that at least one of $R^4$, $R^{13}$ and $R^{14}$ has a chain of at least 8 carbon atoms, more preferably at least 10 carbon atoms, uninterrupted by any heteroatom.

The compound of Formula I can be used as the free base, or in the form of its acid addition or quaternary ammonium salt, i.e.

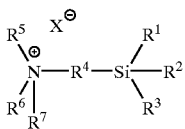

wherein $R^1$, $R^2$, $R^3$, $R^4$, $R^5$ and $R^6$ are as defined above; $R^7$ is selected from the group comprising hydrogen, a $C_{1-40}$ alkyl group or $C_{2-40}$ mono-, di- or tri-unsaturated alkenyl group, and X is an anion. X is suitably chlorine, bromine, or sulphate, of which chlorine and bromine are preferred, and $R^7$ is preferably hydrogen.

Non-limiting examples of suitable salts of compounds of Formula I include N-oleyl-N-[(3-triethoxysilyl)propyl] ammonium chloride, N-3-aminopropylmethyidiethoxysilane hydrobromide, (aminoethylaminomethyl) phenyltrimethoxysilane hydrochloride, N-[(3-trimethoxysilyl)propyl]-N-methyl, N-N-diallylammonium chloride, N-tetradecyl-N,N-dimethyl-N-[(3-trimethoxysilyl)propyl]ammonium bromide, 3[2-N-benzylaminoethylaminopropyl]trimethoxysilane hydrochloride, N-octadecyl-N,N-dimethyl-N-[(3-trimethoxysilyl)propyl]ammonium bromide, N-[(trimethoxysilyl)propyl]-N-tri(n-butyl)ammonium chloride, N-octadecyl-N-[3-triethoxysilyl)propyl] ammonium chloride and N-2-(vinylbenzylamino)ethyl-3-aminopropyl-trimethoxysilane hydrochloride.

It is preferred to use the compound of Formula I in salt form. The most preferred compound is N-oleyl-N-[(3-trimethoxysilyl)propyl]ammonium chloride.

The amount of the compound of Formula I may be between 0.1 and 20 percent by weight of the mineral particles in the slurry (dry basis) and preferably between 0.25 and 10 percent by weight and most preferably between 0.5 and 2 percent by weight. Preferably, the amount of the compound of Formula I used varies inversely with the mineral particle size. The compound may be added to the slurry in its natural state, either as a liquid or a solid. However, to facilitate dispersion, it is preferred where possible to add the compound as a liquid. If the melting point of the compound is below 95 degrees Celsius, it is preferred to add it to the slurry in a molten state at a temperature at least 5 degrees Celsius above the melting point, provided the temperature of the compound in the liquified state does not exceed 100 degrees Celsius and provided that the compound does not decompose under these conditions. If the melting point exceeds 95 degrees Celsius, it is most preferred to use a solvent. Preferred solvents are water and alcohols containing 1 to 5 carbon atoms and most preferably those containing 1 to 3 carbon atoms, that is to say methanol, ethanol, n-propanol or isopropanol. If the compound of Formula I is an alkoxysilane, then most preferably the alkoxy group of the solvent alcohol will be the same as the alkoxy group of the alkoxysilane. For example, if the compound of Formula I is a methoxysilane, the preferred solvent is methanol. The concentration of the compound in the solvent may be from 10 to 90 percent by weight and more preferably between 25 and 75 percent by weight and most preferably 50 percent by weight. Preferably, the solution can be prepared and added to the slurry at a temperature between a lower limit of 0 degrees Celsius and an upper limit which is the lower of at least 10 degrees below the boiling point of the solvent and 95 degrees Celsius. The dispersion of the compound is effected by mixing.

It is preferred that, for the specific compound of Formula I which is added, the equivalent balance (EB) should be calculated. The EB is used to determine whether mineral acid or alkali metal hydroxide, or solution thereof, should be added. The equivalent balance (EB) may be determined from the absolute value of the sum of the group values of X (if present), $R^1$, $R^2$ and $R^3$ and the magnitude of the sum of the group contributions of X (if present), $R^1$, $R^2$ and $R^3$ together with the weight added and the molecular weight of the compound of Formula I, according to the following scheme: The group contribution of X for either X=Cl or X=Br is −1, thus, if X is present, it is given a value of −1. The group contribution of each of $R^1$, $R^2$ and $R^3$ is generally zero for all groups except as follows: if the group is $CH_3COO$, Cl or Br, in which case it is −1, or if it is amine (including an imine), ONa, OK or OLi in which case it is +1. If the sum of the group contributions for X, $R^1$, $R^2$ and $R^3$ is zero, no adjustment with mineral acid or alkali metal hydroxide (or solutions thereof) is necessary. If the sum of the group values is a positive integer, adjustment with mineral acid is desirable, and if it is negative, adjustment with alkali metal hydroxide is desirable.

For example, where $R^1=OCH_3$, $R^2=CH_3$, $R^3=Cl$ and X=Br, the sum of the group values (g.v.) is:

$$\Sigma = (g.v.\ OCH_3) + (g.v.\ CH_3) + (g.v.\ Cl) + (g.v.\ Br) = (0) + (0) + (-1) + (-1) = -2$$

The negative sign in front of the sum indicates adjustment with alkali metal hydroxide is required. The number of equivalents of alkali required is given by the equivalent balance (EB) which includes the absolute value of the sum of the group contributions ($|\Sigma|$) as a scaling factor:

$$EB = \frac{|\Sigma| \times \text{weight in grams of the chemical added}}{\text{molecular weight of the added chemical}}$$

In continuing the example, if a process according to the present invention were scaled so as to require 6,000 grams of a chemical of Formula I with a molecular weight of 350 grams and the sum of the group values gave −2, EB would be calculated as follows:

$$EB = -2 \times 6000/350 = -34.28 \text{ gram-equivalents}$$

Thus, in this example, 34.28 gram-equivalents of alkali metal hydroxide would be added. Sodium hydroxide is the preferred alkali metal hydroxide. The weight of sodium hydroxide would be:

Weight=(EB)×(Equivalent Weight of NaOH)=34.28×40.0=1371.2 grams

The preferred technique according to the invention is to dissolve the alkali metal hydroxide or mineral acid in water so as to obtain a concentration between 5 and 25% by weight and most preferably between 5 and 10% by weight prior to adding the solution to the slurry.

It is known to incorporate a coupling agent into rubber that is intended to be vulcanized and used, for instance, in tires. Suitable coupling agents include those described in U.S. Pat. No. 4,704,414, published European patent application 0,670,347A1 and published German patent application 4435311A1, the disclosures of each of which are incorporated by reference. One suitable coupling agent is a mixture of bis[3-(triethoxysilyl)propyl]monosulfane, bis[3-(triethoxysilyl)propyl]disulfane, bis[3-(triethoxysilyl) propyl]trisulfane and bis[3-(triethoxysilyl)propyl] tetrasulfane and higher sulfane homologues—for example, coupling agents available under the trade names Si-69 (average sulfane 3.5), Silquest™ A-1 589 or Si-75 (average sulfane 2.0). Another non-limiting examples of a suitable coupling agent is bis[2-(triethoxysilyl)ethyl]tetrasulfane, available under the trade name Silquest RC-2. In the past, achieving a good balance between the coupling agent and particles, such as silica, without scorching or premature curing has proven difficult. In accordance with the invention, if particles, particularly silica particles, are being treated to render them hydrophobic for use in rubber which is subsequently to be vulcanized, it is possible to include a step of adding a coupling agent in the process of the invention, so that the coupling agent becomes attached to the surface of the hydrophobicized mineral particles and becomes dispersed in the rubber with the mineral particles.

Thus, in some preferred embodiments of the invention, a coupling agent is added to the dispersion, more preferably after the addition of the compound of Formula I but before the compound of Formula II is added. As discussed above, in some cases, Formulae I and II may represent the same compound. In these cases, it is preferred to add the coupling agent between sequential additions of the compound of Formulae I and II.

The coupling agent may be added after any addition of mineral acid or alkali metal hydroxide that is indicated by the calculation of the EB. Non-limiting examples of suitable coupling agents include compounds of formula:

in which at least one of $R^8$, $R^9$ and $R^{10}$, preferably two of $R^8$, $R^9$ and $R^{10}$ and most preferably $R^8$, $R^9$ and $R^{10}$, are hydroxyl or hydrolysable groups. The groups $R^8$, $R^9$ and $R^{10}$ are bound to the atom M, which is silicon, titanium or zirconium. The group $R^8$ may be hydroxyl or $OC_pH_{2p+1}$ where p is from 1 to 10 and the carbon chain may be interrupted by oxygen atoms, to give groups, for example, of formula $CH_3OCH_2O—$, $CH_3OCH_2OCH_2O—$, $CH_3(OCH_2)_4O—$, $CH_3OCH_2CH_2O—$, $C_2H_5OCH_2O—$, $C_2H_5OCH_2OCH_2O—$ or $C_2H_5OCH_2O—$. Alternatively $R^8$ may be phenoxy. If M is titanium or zirconium, $R^8$ may be the neopentyl(diallyl) oxy group, but not if M is silicon. The group $R^9$ may be the same as $R^8$. If M is silicon, $R^9$ may also be a $C_{1-10}$ alkyl group, a phenyl group, or a $C_{2-10}$ mono- or diunsaturated alkenyl group. If M is titanium or zirconium, $R^9$ may be the neopentyl(diallyl)oxy group, but not if M is silicon. Further, $R^9$ may be the same as the group $R^{11}$ described below.

$R^{10}$ may be the same as $R^8$, but it is preferred that $R^8$, $R^9$ and $R^{10}$ are not all hydroxyl. If M is silicon, $R^{10}$ may also be $C_{1-10}$ alkyl, phenyl, $C_{2-10}$ mono- or diunsaturated alkenyl. If M is titanium or zirconium, $R^{10}$ may be the neopentyl (diallyl)oxy group, but not if M is silicon. Further $R^{10}$ may be the same as the group $R^{11}$ described below.

The group $R^{11}$ attached to M is such that it may participate in a crosslinking reaction with unsaturated polymers by contributing to the formation of crosslinks or by otherwise participating in crosslinking. In the case where M is silicon, $R^{11}$ may have one of the following structures: $R^{11}$ may represent the allyl group $—H_2CCH=CH_2$, the vinyl group $—CH=CH_2$, the 5-bicycloheptenyl group or the group described by

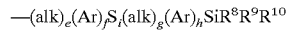

where $R^8$, $R^9$ and $R^{10}$ are the same as previously defined, alk is a divalent straight hydrocarbon group having between 1 and 6 carbon atoms or a branched hydrocarbon group having between 2 and 6 carbon atoms, Ar is either a phenylene $—C_6H_4—$, biphenylene $—C_6H_4—C_6H_4—$ or $—C_6H_4—OC_6H_4—$ group and e, f, g and h are either 0, 1 or 2 and i is an integer from 2 to 8 inclusive with the provisos that the sum of e and f is always 1 or greater than 1 and that the sum of g and h is also always 1 or greater than 1. Alternately, $R^{11}$ may be represented by the structures $(alk)_e(Ar)_fSH$ or $(alk)_e(Ar)_fSCN$ where e and f are as defined previously. Moreover, it is possible for $R^{11}$ to have the structure

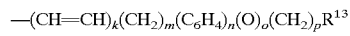

wherein k, m, n and o and p are all whole numbers and $R^{13}$ represents the acryloxy $CH_2=CHCOO—$ or the methacryloxy $CH_2=CCH_3COO—$ group. Further, the value of k may be 0 or 1, m may be from 0 to 20 inclusive, n may be between 0 and 2, o may be 0 or 1, and p may be from 0 to 20 inclusive, with the provisos that the sum of k, m, n and o is at least 1 and not greater than 20, and that if n is 1 or 2 or o is 1, p is 1 or greater. It is most preferable that m=3 and k, n, o and p are all 0.

Preferably, $R^8$, $R^9$ and $R^{10}$ are all either $OCH_3$, $OC_2H_5$ or $OCH_8$ groups and most preferably all are $OCH_3$ groups. It is most preferred that the coupling agent is bis[3-(trimethoxysilyl)propyl]tetrasulfane (Si-168). The amount of coupling agent to add is optional; levels between 2 and 10 percent by weight of the silica in the slurry (dry basis) are preferred. The dispersion of the chemical may be effected by mixing.

Non-limiting illustrative examples of other coupling agents, include the following: bis[(trimethoxysilyl)propyl)] disulfane (Si-166), bis[(triethoxysilyl)propyl)]disulfane (Si-266), bis[2-(trimethoxysilyl)ethyl]-tetrasulfane, bis[2-(triethoxysilyl)ethyl]trisulfane, bis[3-(trimethoxysilyl) propyl]-disulfane, 3-mercaptopropyltrimethoxysilane, 3-mercaptopropylmethyldiethoxysilane, 3-mercaptoethylpropylethoxymethoxysilane, 1,3-bis(3-acryloxypropyl)tetramethoxydisiloxane, acryloxypropylmethyldimethoxysilane, 3-methacryloxypropyl-trimethoxysilane, allyltrimethoxysilane, diallyldiethoxysilane, 5-(bicycloheptenyl)triethoxysilane, 5-(bicycloheptenyl) methylmethoxyethoxysilane, isopropoxytriacryltitanate, diisopropyldimethacryltitanate, diethoxydi(3-mercaptopropoxy)zirconate, triisopropoxy-(2-mercaptoethoxy)zirconate, and di[neopentyl(diallyl)oxy]-di (3-mercaptopropoxy)-zirconate.

Other preferred coupling agents include those disclosed in published German patent application 44 35 311 A1. On pages 2 and 3, there is disclosure of oligomers and polymers of sulphur containing organooxysilanes of the general formula:

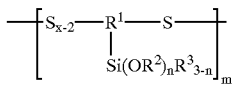

in which $R^1$ is a saturated or unsaturated, branched or unbranched, substituted or unsubstituted hydrocarbon group that is at least trivalent and has from 2 to 20 carbon atoms, provided that there are at least two carbon-sulphur bonds, $R^2$ and $R^3$, independently of each other, are saturated or unsaturated, branched or unbranched, substituted or unsubstituted hydrocarbon groups with 1 to 20 carbon atoms, halogen, hydroxy or hydrogen, n is 1 to 3, m is 1 to 1000, p is 1 to 5, q is 1 to 3 and x is 1 to 8.

Preferred compounds are of the general formula

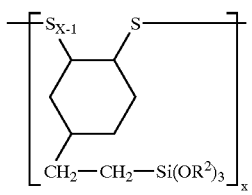

wherein $R^2$, m and x have the meanings given above, and $R^2$ is preferably methyl or ethyl. These compounds disclosed in German Patent Application No. 44 35 311 A1 are preferred coupling agents for use in the present invention.

Also preferred for use in this invention are coupling agents disclosed in the abbvementioned published European patent application 0,670,347A1, which discloses coupling agents of the general formula:

$$R^1R^2R^3Si—X^1—(—S_x—Y—)_m—(—S_x—X^2—SiR^1R^2R^3)_n$$

in which $R^1$, $R^2$ and $R^3$ are the same or different and are $C_{1-8}$ alkyl, $C_{1-8}$ alkoxy, phenyl or phenoxy, provided that at least one of $R^1$, $R^2$ and $R^3$ is an alkoxy or phenoxy group. $X^1$ and $X^2$ are the same or different and are divalent linear or branched, optionally unsaturated $C_{1-12}$ alkyl groups, Y is a di-, tri- or tetravalent linear, branched or cyclic $C_{1-18}$ alkyl group that is optionally unsaturated and is optionally substituted by $C_{6-12}$ aryl, $C_{1-8}$ alkoxy or hydroxy groups and which can be interrupted by oxygen, sulphur or nitrogen atoms or aromatic $C_{6-12}$ aryl groups, or Y is a $C_{6-12}$ aryl or heteroaryl group, m is an integer from 1 to 20, n is an integer from 1 to 6 and x is an integer from 1 to 6.

Particularly preferred coupling agents are those of the following general formulae:

$$(RO)_3SiCH_2CH_2CH_2-[S_x-CH_2CH_2]_n-S_x-CH_2CH_2CH_2Si(OR)_3$$

in which $R$=—$CH_3$ or —$C_2H_5$, x=1–6 and n=1–10;

in which $R$=—$CH_3$ or —$C_2H_5$, x=1–6 and n=1–10;

$$(RO)_3SiCH_2CH_2CH_2-[S_x-(CH_2)_6]_n-S_x-CH_2CH_2CH_2Si(OR)_3$$

in which $R$=—$CH_3$, —$C_2H_5$ or —$C_3H_7$, n=1–10 and x=1–6;

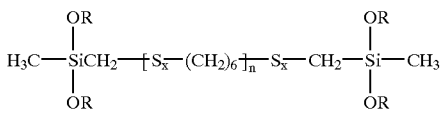

in which $R$=—$CH_3$, —$C_2H_5$ or —$C_3H_7$, n=1–10 and x=1–6;

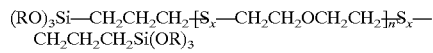

in which $R$=—$CH_3$, —$C_2H_5$ or —$C_3H_7$, n=1–10 and x=1–6;

$$(RO)_3Si—CH_2CH_2CH_2-[S_x—CH_2CH_2OCH_2CH_2]_n-S_x—CH_2CH_2CH_2Si(OR)_3$$

in which $R$=—$CH_3$, —$C_2H_5$, —$C_3H_7$, n=1–10 and x=1–6;

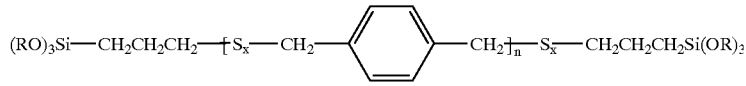

in which $R$=—$CH_3$, —$C_2H_5$ or $C_3H_7$, n 1–10 and x=1–6;

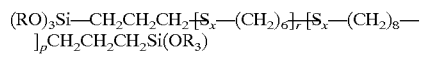

in which $R$=—$CH_3$, —$C_2H_5$, or —$C_3H_7$; $R^1$=—$CH_3$, —$C_2H_5$, —$C_3H_7$, —$C_6H_5$, —$OCH_3$, —$OC_2H_5$, —$OC_3H_7$ or —$OC_6H_5$, n=1–10 and x=1–8; and $$(RO)_3Si—CH_2CH_2CH_2-[S_x-(CH_2)_6]_r-[S_x-(CH_2)_8-]_pCH_2CH_2CH_2Si(OR_3)$$

in which $R$=—$CH_3$, —$C_2H_5$ or —$C_3H_7$, r+p=2–10 and x=1–6.

Especially preferred are coupling agents of the formulae:

$$(RO)_3SiCH_2CH_2CH_2-[S_x—(CH_2CH_2)_6]_n-S_x—CH_2CH_2CH_2—Si(OR)_3$$

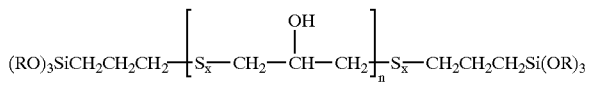

in which x is 1–6 and n is 1–4.

In Step (b) of the process, the compound of Formula II is added to the particulate filler material. Again, it is preferred that the particulate filler material, more preferably a mineral filler, is in the form of an aqueous slurry or a dispersion, and the compound of Formula II is added to the slurry or dispersion under intense mixing. In the compound of Formula II the possible and preferred values for $R^{15}$, $R^{16}$ and $R^{17}$ are the same as the possible and preferred values for $R^1$, $R^2$ and $R^3$ that are discussed above in relation to Formula I. If $R^{12}$ is an amino group of formula —$R^{18}$—$NR^{19}R^{20}$, preferred values for $R^{18}$ are such that N—$R^{18}$—Si includes groups of the formula:

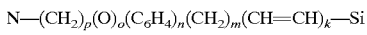

in which k is 0 or 1, m is 0 to 20 inclusive, n is 0, 1 or 2, o is 0 or 1 and p is 0 to 20 inclusive, provided that the sum of k, m, n, o and p is at least 1 and not greater than 20, and further provided that if o is 1, p is also 1 or greater, and the sum of k, m and n is 1 or greater. The order of the moieties between N and Si is not particularly restricted other than neither N or O should be directly bound to Si. There should be no hydrolysable group between the silicon and nitrogen atoms. Preferably k, n, o and p are all 0 and m is 3, i.e. $R^{18}$ is —$CH_2CH_2CH_2$—.

$R^{12}$ may be a moiety containing at least one primary, secondary, or tertiary amine nitrogen. In this case the amino group bonded to $R^{18}$— is given by the formula —$NR^{19}R^{20}$. $R^{19}$ may be a H or a $C_{1-40}$ alkyl group or a $C_{2-40}$ mono-, di- or tri-unsaturated alkenyl group. $R^{19}$ may also be a $C_{1-20}$ alkyl-substituted or $C_{2-20}$ alkenyl-substituted aromatic group. The aromatic group may be, for example, the phenylene group —$(C_6H_4)$—, the biphenylene group —$(C_6H_4)$—$(C_6H_4)$—, the —$(C_6H_4)$—O—$(C_6H_4)$— group, or the naphthylene group —$(C_{10}H_6)$—. $R^{20}$ may be one of the same groups as $R^{19}$ with the further proviso that at least one of $R^{19}$ and $R^{20}$ must contain a continuous carbon chain of at least 8 carbons in length, uninterrupted by any heteroatoms.

As stated above, if $R^{19}$ and $R^{20}$ are other than hydrogen, the carbon atom attached to the nitrogen atom is not tertiary. Preferably the carbon atom attached to the nitrogen atom is primary, i.e., —$CH_2$—.

It is preferred that $R^{19}$ is a mono-unsaturated alkenyl group of 12–20 carbons in length and most preferable that $R^{19}$ is a monounsaturated alkenyl group of 16 to 18 carbons in length. It is most preferable also that $R^{20}$ is H.

Alternatively, $R^{12}$ may be a moiety which contains a mineral acid salt or a quaternary ammonium salt of an amine. The formula of $R^{12}$ may thus be described by the extended formula —$R^{18}$—$NR^{19}R^{20}.R^{21}$x wherein —$R^{18}$—, $R^{19}$ and $R^{20}$ are as previously defined and $R^{21}$ may be a H, or a $C_{1-40}$ alkyl or $C_{2-40}$ mono-, di- or tri-unsaturated alkenyl group and X is an anion, preferably Cl or Br, although sulphate can be used.

There is the further proviso that at least one of $R^{19}$ and $R^{20}$ must contain a continuous carbon chain of at least 8 carbons in length, uninterrupted by any heteroatom. It is preferred to use an amine salt where $R^{19}$ is a mono- or di-unsaturated alkenyl group of 12–20 carbons in length and most preferably that $R^{19}$ is a mono- or di-unsaturated alkenyl group of 16 to 18 carbons in length. It is most preferable also that $R^{20}$ is H and that $R^{21}$ is H and X is chlorine. The preferred hydrophobicizing agent of Formula II is N-oleyl-N-(3-trimethoxysilyl)propyl ammonium chloride.

Preferably, the amount of the hydrophobic compound of Formula II to add is generally between 0.5 and 20 percent by weight of the weight of the particles (preferably mineral particles such as silica) in the slurry (dry basis), and is inversely proportional to the particle size of the silica particles. The compound may be added to the slurry in its natural state, either as a liquid or a solid. However, to facilitate dispersion, it is preferred, where possible, to add the compound as a liquid. If the melting point of the compound is below 95 degrees Celsius, it is preferred to add it to the slurry in a molten state at a temperature at least 5 degrees Celsius above the melting point, provided the temperature of the compound in the liquified state does not exceed 100 degrees Celsius and provided that the compound does not decompose under these conditions. If the melting point exceeds 95 degrees Celsius, it is most preferred to use a solvent. Suitable solvents are alcohols containing 1 to 5 carbon atoms and most preferably those containing 1 to 3 carbon atoms, that is to say methanol, ethanol, n-propanol or isopropanol. If the compound of Formula II is an alkoxysilane, most preferably the alkoxy group of the solvent alcohol will be the same as the alkoxy group of the alkoxysilane. For example, if the compound of Formula II is a methoxysilane, the preferred solvent is methanol. The concentration of the compound in the solvent may be from 10 to 90 percent by weight and most preferably between 25 and 75 percent by weight and most preferably 50 percent by weight. Preferably, the solution is prepared and added to the slurry at a temperature between a lower limit of 0 degrees Celsius and an upper limit which is the lower of at least 10 degrees below the boiling point of the solvent and 95 degrees Celsius.

After the addition of the hydrophobic compound of Formula II which is added, the equivalent balance (EB) should be calculated to determine how much, if any, mineral acid or alkali metal hydroxide (or solutions thereof) to add. The equivalent balance (EB) may be determined from the absolute value of the sum of the group values of X, $R^{15}$, $R^{16}$ and $R^{17}$ and the weight added, and the molecular weight of the compound, according to the following scheme: The group contribution of X for either X=Cl or X=Br is −1, thus if X is present it is given a value of −1. The group contribution of each of $R^{15}$, $R^{16}$ and $R^{17}$ is generally zero for all groups except as follows: if the group is $CH_3COO^\ominus$, $Cl^\ominus$ or $Br^\ominus$, in which case it is −1, or if it is amino, ONa, OK, or OLi in which case it is +1. If the sum of the group contributions for X, $R^{15}$, $R^{16}$ and $R^{17}$ is zero, no adjustment with mineral acid or alkali metal hydroxide (or solutions thereof is necessary. If the sum of the group values is a positive integer, adjustment with mineral acid is desirable, and if it is negative, adjustment with alkali hydroxide is desirable.

For example, where $R^{15}$=$OC_2H_5$, $R^{16}$=$OCH_3$ $R^{17}$=$CH_3$ and X=Cl, the sum Σ of the group values (g.v.) is:

$$\Sigma=(g.v.\ OC_2H_5)+(g.v.\ OCH_3)+(g.v.\ CH_3)+(g.v.\ Cl)=(0)+(0)+(0)+(-1)=-1.$$

The negative sign in front of the sum indicates adjustment with alkali metal hydroxide is required. The number of equivalents of alkali required is given by the equivalent balance (EB) which includes the absolute value of the sum of the group contributions (|Σ|) as a scaling factor.

$$EB = \frac{|\Sigma| \times \text{weight in grams of the compound added}}{\text{molecular weight of the added chemical}}$$

In continuing the example, if a process according to the present invention were scaled so as to require 3450 grams of a compound of Formula II with a molecular weight of 466 grams and the sum of the group values gave −1, EB would be calculated as follows:

$$EB=|-1|\times 3450/466=7.4 \text{ gram-equivalents.}$$

Thus, in this example, 7.4 gram-equivalents of alkali metal hydroxide would be added. Sodium hydroxide is the preferred alkali metal hydroxide. The weight of sodium hydroxide added would be:

$$\text{Weight}=(EB)\times(\text{Equivalent Weight of NaOH})=7.4\times 40.0=296 \text{ grams.}$$

The preferred technique according to the invention is to dissolve the alkali hydroxide or mineral acid in water so as to obtain a concentration between 5 and 25% by weight and mos t preferably between 5 and 10% by weight prior to adding the solution to the slurry. The temperature of the solution may be from 0 degrees Celsius to 100 degrees Celsius under atmospheric pressure, or if a pressure vessel is used for preparation of the solution, it may be from 0 degrees Celsius to 130 degrees Celsius. It is preferred that the temperature of the solution be within 10 degrees of the solution of the slurry. The dispersion of the solution in the slurry is effected by mixing.

The process described thus far provides an aqueous slurry or dispersion of hydrophobicized silica (i.e., it has not yet been contacted with an elastomer or other substrate to be filled), which can be used as such or can be filtered and dried. In a preferred embodiment, the hydrophobicized silica, in the aqueous dispersion or slurry, is mixed with a hydrocarbon or or other solution of solution SBR (including low vinyl, low styrene solution SBR), solution BR or mixtures thereof to form a rubber masterbatch. It is particularly preferred that the hydrophobicized silica shall have been treated with a coupling agent, for example Si-69, Si-168 or Silquest RC-2, as discussed above. Preferably, the solvent in which the elastomer is dissolved is immiscible with, or mostly immiscible with, water to form a preblend. This elastomer solution may be made by dissolving the solid elastomer in a solvent, or it may be the solution resulting from the polymerisation of monomers in the solvent. Optionally, processing oil and antioxidants may be added to the hydrocarbon solution prior to mixing with the slurry, or they may be added after mixing the slurry and the elastomer solution.

The viscosity of the final elastomer solution, sometimes referred to as an elastomer cement, containing the optional ingredients is preferably such that it closely matches the viscosity of the silica slurry and is generally between 1,000 and 50,000 centipoise. The temperature of the elastomer solution is preferably the same as that of the slurry and the amount of cement that is added is such that the final masterbatch may contain from 5 to 250 parts of silica per hundred parts of elastomer, preferably from 35 to 100 parts of silica per hundred parts of elastomer, most preferably from 60 to 80 parts of silica per hundred parts of elastomer.

The elastomer cement and, optionally, oil and antioxidants, is mixed with the silica slurry until the mixture becomes homogeneous and the milky colour of the silica slurry disappears to form a preblend. A small amount of water may separate at this stage.

If not added previously, or if additional amounts are desired, oil and antioxidants may be added next and the mixing continued further until the oil and antioxidant become incorporated in the continuous phase.

Any water which separates from the preblend may be removed, discarded or recycled for silica slurry make-up by stopping the agitator for a suitable period and allowing the water phase to accumulate in the bottom of the mixing tank from which it may be drained prior to proceeding with the next step. Agitation is preferably restarted after the water layer is removed.

If antioxidants and processing oil were not previously added, or if additional amounts are desired, they may be added at this stage and stirring continued until the preblend is again homogeneous.

The preblend is then added to water heated to a temperature equal to, or preferably higher than the boiling point of the solvent used for the elastomer cement so as to remove the solvent and produce a masterbatch coagulum in the form of a crumb suspended in water. The preferable temperature of the water prior to addition of the preblend is between 50 and 100 degrees Celsius, most preferably between 90 and 95 degrees Celsius, and the preblend is added at a rate so as to maintain a so-fixed or reasonably so-fixed water temperature throughout the coagulation. The agitation is set sufficiently high so as to maintain the crumb in a suspended state within the water but not so high as to cause the crumb to subdivide into particles smaller than approximately 5 millimeters.

The solvent may be recovered from the coagulator by recondensing the vapours. The material containing the suspended crumb is passed through a filter screen sized so as to recover the wet masterbatch. The material passing through the screen may be optionally recycled for further silica slurry make-up.

The wet crumb is dried such as by using forced air or fluidized bed or microwave drying techniques at a temperature between about 75 and about 135 degrees Celsius, preferably between about 85 and about 120 degrees Celsius, most preferably between about 85 and about 105 degrees Celsius, until a suitably dry masterbatch crumb is obtained.

The dried crumb may be further processed according to industry and customer requirements.

Embodiments of the present invention will be described with reference to the following Examples which should not be used to limit the scope of the invention.

General Remarks The abbreviation "phr" represents "parts per hundred parts rubber". "Parts" represents parts per 100 parts rubber. The terms "rubber" and "polymer" are used interchangeably.

The vinyl solution styrene butadiene used was based on a commercial grade Buna VSL 5025-1, (formerly Buna VSL 1950S25 available from Bayer). This is a co-polymer of styrene and butadiene, the styrene content being about 25% and the vinyl content of the butadiene portion being about 67%, this grade further contains about 37.5 parts per 100 parts of total polymer of highly aromatic oil. To the above polymer was added 80 parts, per 100 parts of total polymer of silica hydrophobicized by the above described method of Canadian application number 2,205,789 using 4.0 parts per 100 of total polymer of N-oleyl-N-(3-trimethoxysilyl) propylamine, and with 6.4 parts per 100 of total polymer of the silane coupling agent Si69; for a total of 228.0 parts per 100 parts of polymer. The resulting silica masterbatch product was given the designation XQ209.

The high cis polybutadiene rubber used was based on a commercial grade Taktene 1203 (available from Bayer) which has a cis content of about 96%. To this polymer was added 80 parts by weight per 100 parts of total polymer, of silica hydrophobicized as described above using 4.0 parts per 100 of polymer of N-oleyl-N-(3-trimethoxysilyl) propylamine and 6.4 parts per 100 of polymer of the silane coupling agent Si69, mixed with 30 parts by weight per 100 parts of polymer of highly aromatic oil; for a total of 220.4 parts per 100 parts of polymer. The resulting silica masterbatch product was given the designation XQ211.

The above two silica masterbatch polymers were mixed in an internal mixer followed by a mill mix in a ratio of 70 parts by weight per 100 parts of polymer of the XQ209 to 30 parts by weight per 100 parts of polymer of XQ211; other compounding ingredients commonly used in the industry such as zinc oxide, stearic acid, antidegradants, sulfur and accelerators (added on a rubber mill) were also included in the mixture. The resulting compounds were then cured in appropriate test sample shapes by heating at about 166° C. for a period of time varying from 10 minutes to 15 minutes depending on the test sample configuration.

EXAMPLE I

In the following Example, compounds "A" and "B" are comparative examples while compounds "C", "D", "E" and "F" are compounds according to the invention by virtue of containing hydrophobicized silica in the polymer masterbatch form. In this Example all the compounds are formulated so as to contain 70 parts by weight per 100 polymer of the vinyl solution SBR (VSL5025-1) and 30 parts per 100 polymer of the high cis polybutadiene (Taktene 1203), a total filler content of 80 parts and a total oil content of 35.3 parts. The black-containing compound "A" contains the frequently used tire tread carbon black N234 available from Cabot Carbon. It is noted that the silica-containing compounds (compounds "B" to "F") all contain the equivalent of 6.4 parts of silane coupling agent Si69 available from Degussa; additionally these compounds contain the accelerator Vulkacit D/C (DPG) available from Bayer which is necessary for the dry mix compound "B" to adequately accelerate the vulcanisation of dry mixed silica compounds and is included in compounds "C" to "F" for purposes of comparison.

XQ209 SSBR in Table 1 is a solution SBR silica masterbatch as previously described:

137.5 Buna VSL 5025-1 (100 polymer, 37.7 aromatic oil)
80 Silica
6.4 Si69
4.0 N-oleyl-N-(3-trimethoxysilyl)propylamine.

XQ209B SSBR in Table 1 is the same composition as XQ209 SSBR but was extruded through a drying extruder as part of the drying process.

XQ211 BR in Table 1 is a high cis polybutadiene silica masterbatch as previously described:

100 Taktene 1203
80 Silica
30 Aromatic process oil
6.4 Si69
4.0 N-oleyl-N-(3-trimethoxysilyl)propylamine XQ211B BR in Table 1 is the same composition as XQ211 but was extruded through a drying extruder as part of the drying process.

The other ingredients are all common to each compound formulation and are readily available in the industry. The compound formulations are shown in Table 1 below.

TABLE 1

| COMPOUND | | A | B | C | D | E | F |
|---|---|---|---|---|---|---|---|
| Buna VSL 5025-1 | 1A | 96.3 | 96.3 | | | | |
| TAKTENE 1203 | 1A | 30 | 30 | | | | |
| XQ 209 SSBR (J-09093) | 1A | | | 159.6 | 159.6 | | |
| XQ 209B SSBR (J-09092) | 1A | | | | | 159.6 | 159.6 |
| XQ 211 BR (J-09094) | 1A | | | 66.1 | 66.1 | | |
| XQ 211B BR (J-09095) | 1A | | | | | 66.1 | 66.1 |
| N 234 Carbon Black | 1B | 80 | | | | | |
| HI-SIL 233 | 1B | | 80 | | | | |
| SILANE Si-69 | 1B | | 6.4 | | | | |
| STEARIC ACID | 1B | 1 | 1 | 1 | 1 | 1 | 1 |
| SUNDEX 790 | 1B | 9 | 9 | | | | |
| SUNPROOF IMPROVED WAX | 1B | 1.5 | 1.5 | 1.5 | 1.5 | 1.5 | 1.5 |
| VULKANOX 4020 (6 PPD) | 1B | 1 | 1 | 1 | 1 | 1 | 1 |
| VULKANOX HS/LG (TMQ) | 1B | 1 | 1 | 1 | 1 | 1 | 1 |
| ZINC OXIDE (KADOX 920) | 1B | 2.5 | 2.5 | 2.5 | 2.5 | 2.5 | 2.5 |
| SULFUR NBS | 1C | 1.4 | 1.4 | 1.4 | 1.4 | 1.4 | 1.4 |
| VULKACIT CZ/EG-C (CBS) | 1C | 1.7 | 1.7 | 1.7 | 1.7 | 1.7 | 1.7 |
| VULKACIT D/C (DPG) | 1C | | 2 | 2 | 2 | 2 | 2 |
| TOTAL | | 225.4 | 233.8 | 237.8 | 237.8 | 237.8 | 237.8 |
| Specific Gravity | | 1.148 | 1.190 | 1.189 | 1.189 | 1.189 | 1.189 |

Hi-Sil 233 is a silica supplied by PPG Industries Inc.

Sundex 790 is an aromatic process oil supplied by Sun Co.

Sunproof Improved Wax is a wax supplied by Uniroyal Chemical.

Vulkanox 4020 and Vulkanox HS/CL are antioxidants supplied by Bayer.

Vulkacit CZ/EG-C and Vulkacit D/C are accelerators supplied by Bayer.

In order to prepare vulcanized specimens for testing, the ingredients of the compound formulations shown above were mixed in an internal rubber compound mixer, the particular mixer being a BR-82 Banbury mixer with a volumetric capacity of 1600cc. The mixer settings were:

| | |
|---|---|
| Speed: | 77 rpm |
| Cooling medium | set @ 25° C. |
| Ram pressure | 30 psi |
| Start temperature | 40° C. |

The mix procedure used for compound A was as follows: the Buna VSL 5025-1 and Taktene 1203 rubbers were first added to the Banbury mixer; after 60 seconds the N234 carbon black, stearic acid, Sundex 790 process oil, wax, Vulkanox 4020, Vulkanox HS and zinc oxide were then added and the ram lowered; after a further 180 seconds the ram was raised and any ingredients that had risen over the ram were swept back into the mass; and finally after a further 60 seconds the mixture was dumped from the Banbury mixer for a total banbury mix time of 5 minutes. The mixture was then transferred to a warm (40° C.) two roll mill and 1.4 parts sulfur and 1.7 parts Vulkacit CZ were then blended into the mixture for a mill mix time of four minutes. The nip setting on the mill was then reduced to 0.5 mm and the mixture passed through the mill 6 times in a refining step to give a final mixture whose specific gravity was 1.148.

Compound B in the example shown in Table 1 was prepared by two mixing steps in the internal mixer with again a final step on a warm mill. The internal mixer settings were the same as used for compound A. The first step to prepare the compound B mixture was to add the vinyl solution styrene rubber containing 100 parts rubber and 37.5 parts of aromatic oil extender Buna VSL 5025-1 and the high cis polybutadiene rubber Taktene 1203 to the internal mixer. This mixture was mixed for 60 seconds. To this mixture 40 parts of untreated silica (Hi-Sil 233) and 3.2 parts of Si-69 silane were added and the mixture mixed for an additional 60 seconds. The ram was then raised and an additional 40 parts of untreated silica and 3.2 parts of Si-69 was added to the mixture. After a further 60 seconds the ram was raised and ingredients that had escaped from the mass were swept back into the mass. The ram was then lowered and mixing continued for a further 60 seconds. The ram was again raised after a total elapsed time of 240 seconds and 1 part stearic acid, 9 parts of Sundex 790 extender oil, 1.5 parts of wax, 1 part of Vulkanox 4020, 1 part Vulkanox HS and 2.5 parts of zinc oxide were added; the ram was swept and then lowered and mixing continued for an additional 60 seconds when the ram was again raised and escaped ingredients swept back into the mass and then lowered and mixing continued for an additional 120 seconds after which the mixture was dumped out of the mixer and formed into a sheet. The total elapsed mixing time for step 1 was 7 minutes.

The internal mixer was then allowed to cool to 40° C. and the sheeted out mixture added to the mixer and mixing was continued until the temperature reached 150° C. as measured by the ram temperature probe. The total elapsed time for step 2 was 4.5 minutes.

The final mixing step was done on a warm mill to which were added the mixture from internal mixing step 2, 1.4 parts sulfur, 1.7 parts vulkacit CZ and 2 parts Vulkacit D. This mixture was blended on the mill for four minutes. The nip setting on the mill was then reduced to 0.5 mm and the mixture passed through the mill 6 times in a refining step to give a final mixture whose specific gravity was 1.190.

The mix procedure used for compound C of the formulation as shown in Table 1 was prepared by a single mixing step in an internal mixer followed by a final step on a warm mill. The internal mixer settings were the same as used for compound A. The mix procedure was to add to the internal mixer 159.6 parts per hundred rubber of the vinyl solution SBR/silica masterbatch XQ209, 66.1 parts of high cis BR/silica masterbatch XQ211, 1 part of stearic acid, 1.5 parts of wax, 1 part of Vulkanox 4020, 1 part of Vulkanox HS and 2.5 parts of zinc oxide. The ram is then lowered and the mixture is mixed for 180 seconds at which time the ram is raised and any ingredients that have escaped from the mass are swept back into the mixture. The ram is then lowered and the mixture is mixed for a further 60 seconds and then dumped from the mixer. The total elapsed mixing time for this step was 4 minutes.

The final mixing step for compound C was done on a warm mill to which was added the mixture from the internal mixer, 1.4 parts per hundred rubber of sulfur, 1.7 parts of Vulkacit CZ and 2 parts of Vulkacit D. This mixture was blended on the mill for 4 minutes. The nip setting on the mill was then reduced to 0.5 mm and the mixture passed through the mill 6 times in a refining step to give a final mixture whose specific gravity was 1.189.

The mix procedure used for compounds D, E and F were the same as used for compound C.

From the mixtures prepared to compound formulations A to F vulcanized test specimens were prepared and tested for physical properties that relate to tire tread performance. The test specimens were vulcanized at a temperature of 166° C. for the times as shown on Table 2 below.

TABLE 2

| COMPOUND | A | B | C | D | E | F |
|---|---|---|---|---|---|---|
| DIN Abrasion | | | | | | |
| Vulcanization time (min) | 17 | 23 | 15 | 15 | 15 | 15 |
| Volume Loss (mm$^3$) | 147 | 142 | 120 | 118 | 119 | 123 |
| RSA II TEMP SWEEP | | | | | | |
| Cure Time (min) | 12 | 18 | 10 | 10 | 10 | 10 |
| Cure Temperature: 166° C. | | | | | | |

TABLE 2-continued

| COMPOUND | A | B | C | D | E | F |
|---|---|---|---|---|---|---|
| Frequency: 11 Hz | | | | | | |
| Temperature Range: −60 to 100° C. | | | | | | |
| Auto Strain: 0.05% | | | | | | |
| Pretension Load: 20 g | | | | | | |
| Tan delta @ 0° C. | 0.178 | 0.234 | 0.310 | 0.322 | 0.303 | 0.307 |
| ZWICK REBOUND | | | | | | |
| Cure Time (min) | 17 | 23 | 15 | 15 | 15 | 15 |
| Cure Temperature: 166° C. | | | | | | |
| Resilience @ 100° C. (%) | 46.0 | 61.4 | 65.9 | 64.9 | 64.9 | 66.0 |
| MER 1100 Dynamic Properties | | | | | | |
| Frequency: 20 Hz @ 60° C. | | | | | | |
| Load: 7% static ± 3% dynamic | | | | | | |
| Power Loss (g.m/sec) | 3.94 | 1.75 | 1.13 | 1.05 | 0.99 | 1.00 |
| Tan Delta | 0.299 | 0.155 | 0.141 | 0.130 | 0.136 | 0.132 |

The DIN abrasion test was performed according to DIN 53 516. This test measures the volume loss of the test specimen which has been abraded by a 60 grit emery paper. A low value predicts better abrasion resistance of the compound.

The RSA II (Rheometrics Solid Analyzer—version II) test measures the viscoelastic properties of a vulcanized test specimen which is subjected to low sinusoidal strains in tension over a broad temperature. Experience has shown that the tan delta value at zero degrees Celsius, which is the ratio of the loss modulus to the storage modulus, is a good predictor of the tire tread traction properties. A high value predicts better traction properties.

The Zwick Rebound test was performed according to the method ISO 4662. This test when run at 100° C. measures the resilience properties of the compound which correlates broadly with the rolling resistance properties of a tire tread compound. A high value predicts lower rolling resistance.

The MER 1100 test measures the viscoelastic properties of a rubber compound by applying a sinusoidal compressive strain on a test specimen. The complex, storage and loss modulii are measured from which are calculated the power loss and tan delta. The test is a good predictor of the rolling resistance characteristics of a tire tread compound. A low value for power loss and tan delta predicts lower rolling resistance.

The results from table 2 indicate that the compounds made using the silica containing masterbatch polymers in which the silica has been hydrophobized have physical properties which will provide improved abrasion resistance, traction and lower rolling resistance properties when compared to the comparative example compounds A and B.

What is claimed is:

1. A rubber masterbatch composition comprising a solution SBR (styrene-butadiene rubber) and hydrophobicized silica particles, wherein the solution SBR comprises a low vinyl, low styrene solution SBR, wherein the low vinyl, low styrene solution SBR comprises a vinyl content of less than about 40% and a styrene content in the range of from about 5% to about 25%.

2. The composition defined in claim 1, wherein the low vinyl, low styrene solution SBR comprises a vinyl content in the range of from about 5 to about 40%.

3. The composition defined in claim 1, wherein the low vinyl, low styrene solution SBR comprises a vinyl content in the range of from about 5 to about 25%.

4. The composition defined in claim 1, wherein the low vinyl, low styrene solution SBR comprises a styrene content in the range of from about 10 to about 25%.

5. The composition defined in claim 4, wherein the low vinyl, low styrene solution SBR comprises a styrene content in the range of from about 15 to about 25%.

6. The composition defined in claim 1, wherein solution SBR comprises a mixture of a solution SBR and solution BR.

7. The composition defined in claim 6, wherein the solution BR comprises a high cis-polybutadiene.

8. The composition defined in claim 6, wherein the solution BR comprises more than 90% cis-1,4 bonds.

9. The composition defined in claim 6, wherein the elastomeric composition comprises:
   (i) a solution SBR/silica-containing masterbatch, and
   (ii) a solution BR/silica-containing masterbatch,
      wherein the silica has been hydrophobicized.

10. The composition defined in claim 9, comprising:
   from 40 to 90 parts by weight of the vinyl solution SBR portion of the vinyl solution SBR/silica-containing masterbatch, and
   from 60 to 10 parts by weight of the high cis polybutadiene portion of the high cis polybutadiene/silica-containing masterbatch.

11. The composition defined in claim 1, wherein the silica content in the composition is from about 30 to about 100 phr.

12. The composition defined in claim 1, further comprising 25–50 phr aromatic oil.

13. The composition defined in claim 9, wherein:
   component (i) has a styrene content of from about 15 to about 25%, a vinyl content of the butadiene portion of about 30 to about 75%, and about 25 to about 50 parts, per 100 parts of total polymer, of aromatic oil, and
   component (ii) has a cis content of greater than about 90%, and about 25 to about 50 parts, per 100 parts of total polymer, of aromatic oil.

14. The composition defined in claim 13, wherein component (i) has a styrene content of about 25%, a vinyl content of the butadiene portion of about 67%, and about 37.5 parts per 100 parts of total polymer of aromatic oil, and component (ii) has a cis content of greater than about 90%, and about 30 parts per 100 parts of total polymer of aromatic oil.

15. The composition defined in claim 1, wherein the silica is hydrophobicized by a process comprising the steps of:

(a) contacting the particles with a compound of Formula I:

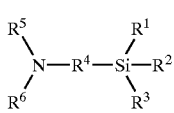
(I)

or an acid addition or quaternary ammonium salt thereof, in which:
at least one of $R^1$, $R^2$ and $R^3$ are hydroxyl or hydrolysable groups;
$R^4$ is a divalent group that is resistant to hydrolysis at the Si—$R^4$ bond;
$R^5$ is selected from the group consisting of: hydrogen; a $C_{1-40}$ alkyl; a $C_{2-40}$ mono-, di- and tri-unsaturated alkenyl group; a $C_6$–$C_{40}$ aryl group; a group of the formula:

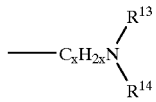

in which x is an integer from 2 to 10, $R^{13}$ and $R^{14}$, which may be the same or different, are each hydrogen; $C_{1-18}$ alkyl; $C_{2-18}$ mono-, di- or tri-unsaturated alkenyl; phenyl; a group of formula:

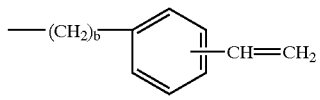

wherein b is an integer from 1 to 10; a group of formula:

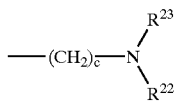

wherein c is an integer from 1 to 10 and $R^{22}$ and $R^{23}$ which may be the same or different, are each hydrogen, $C_{1-10}$ alkyl group or $C_{2-10}$ alkenyl group, provided that there is no double bond in the position alpha to the nitrogen atom; a group of formula:

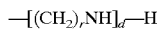

wherein r is an integer from 1 to 6 and d is an integer from 1 to 4;
$R^6$ may be any of the groups defined for $R^5$, or $R^5$ and $R^6$ may together form a divalent group of formula:

in which A is selected from the group consisting of —CHR and —NR group in which R is hydrogen or a $C_{1-40}$ alkyl or $C_{2-40}$ alkenyl group, a $C_6$–$C_{40}$ aryl group, an oxygen atom and a sulfur atom, and t and v are each independently 1, 2, 3 or 4; provided that the sum of t and v does not exceed 6, and (b) contacting the particles with a compound of the Formula II:

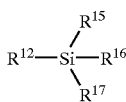
(II)

in which:
$R^{15}$, $R^{16}$ and $R^{17}$ have the same definitions as $R^1$, $R^2$ and $R^3$; and
$R^{12}$ is selected from the group consisting of a $C_{8-40}$ alkyl group, a $C_{8-40}$ mono-, and di- or tri-unsaturated alkenyl group, either of which can be interrupted by one or more aryl groups; a group of formula:

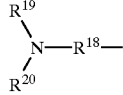

or an acid addition or quaternary ammonium salt thereof in which $R^{18}$ is a divalent group resistant to hydrolysis at the Si—$R^{18}$ bond, $R^{19}$ is selected from the group consisting of hydrogen, a $C_{1-40}$ alkyl group, a $C_{2-40}$ mono-, di- or tri-unsaturated alkenyl group, a substituted aromatic group, wherein the substituted aromatic group is a phenylene group —($C_6H_4$)—, a biphenylene group —($C_6H_4$)—($C_6H_4$)—, a —($C_6H_4$)—O—($C_6H_4$)— group or a naphthylene group, —($C_{10}H_6$)—, the aromatic group being unsubstitued or substituted by a $C_{1-20}$ alkyl or $C_{2-20}$ mono-, di- or tri-unsaturated alkenyl group; and $R^{20}$ is any of the groups defined for $R^{19}$, with the provisos that $R^{19}$ and $R^{20}$ do not have a tertiary carbon atom adjacent to the nitrogen atom and that at least one of $R^{19}$ and $R^{20}$ has a carbon chain at least 8 carbon atoms in length uninterrupted by any heteroatoms.

16. The composition defined in claim 15, wherein the compound of Formula I is selected from the group consisting of 3-aminopropylmethyldiethoxysilane, N-2-(vinylbenzylamino)-ethyl-3-aminopropyltrimethoxysilane, N-(2-aminoethyl)-3-aminopropyltrimethoxysilane, trimethoxysilylpropyldiethylenetriamine, N-2-(aminoethyl)-3-aminopropyltris(2-ethylhexoxy)silane, 3-aminopropyldiisopropylethoxysilane, N-(6-aminohexyl)aminopropyltrimethoxysilane, 4-aminobutyltriethoxysilane, 4-aminobutyldimethylmethoxysilane, triethoxysilylpropyldiethylenetriamine, 3-aminopropyltris(methoxyethoxyethoxy)silane, N-(2-aminoethyl)-3-aminopropyltrimethoxysilane, N-2-(aminoethyl)-3-aminopropyltris(2-ethylhexoxy)silane, 3-aminopropyldiisopropylethoxysilane, N-(6-aminohexyl)aminopropyltrimethoxysilane, 4-aminobutyltriethoxysilane, (cyclohexylaminomethyl)methyldiethoxysilane and N-oleyl-N-(3-trimethoxysilyl) propyl amine or a salt thereof.

17. The composition defined in claim 15, wherein the compound of Formula II is selected from the group consisting of bis[3-(trimethoxysilyl)propyl]monosulfane, bis[3-(trimethoxysilyl)propyl]disulfane, bis[3-(trimethoxysilyl)propyl]trisulfane, bis[3-(trimethoxysilyl)propyl]tetrasulfane, bis[3-triethoxysilyl)propyl]tetrasulfane (Si-69), bis[2-(triethoxysilyl)ethyl]tetrasulfane (Silquest RC-2), bis[2-(trimethoxysilyl)ethyl]tetrasulfane, bis[2-(triethoxysilyl)

ethyl]trisulfane, bis[3-(trimethoxysilyl)propyl]disulfane, 3-mercaptopropyltrimethoxysilane 3-mercaptopropylmethyidiethoxysilane, 3-mercaptoethylpropylethoxymethoxysilane, 1,3-bis(3-acryloxypropyl)tetramethoxydisiloxane, acryloxypropylmethyidimethoxysilane, 3-methacryloxypropyltrimethoxysilane, allyltrimethoxysilane, diallyldiethoxysilane, 5-(bicycloheptenyl)triethoxysilane, 5-(bicycloheptenyl)methylmethoxyethoxysilane, isopropoxytriacryltitanate, diisopropyldimethacryltitanate, diethoxydi(3-mercaptopropoxy)zirconate, triisopropoxy-(2-mercaptoethoxy)zirconate, di[neopentyl(diallyl)oxy]-di(3-mercaptopropoxy)zirconate and N-oleyl-N-(3-trimethoxysilyl) propylamine or a salt thereof.

18. The composition defined in any claim 16, wherein N-oleyl-N-(3-trimethoxysilyl)propylamine or a salt thereof is used as the compound of Formula I.

19. The composition defined in claim 17, wherein N-oleyl-N-(3-trimethoxysilyl)propylamine or a salt thereof is used as the compound of Formula II.

20. The composition defined in claim 18, wherein the salt is N-oleyl-N-(3-trimethoxysilyl)-propyl ammonium chloride.

21. The composition defined in claim 15, wherein the process comprises which comprises the further step of contacting the particles with a coupling agent.

22. A vulcanizate produced from an elastomeric composition comprising a solution SBR (styrene-butadiene rubber) and hydrophobicized silica particles, wherein the solution SBR comprises a low vinyl, low styrene solution SBR, wherein the low vinyl, low styrene solution SBR comprises a vinyl content of less than about 40% and a styrene content in the range of from about 5% to about 25%.

23. The vulcanizate defined in claim 22, in the form of a tire, tire tread, hose, industrial drive belt, conveyor belt or shoe sole.

24. The composition according to claim 19, wherein the salt is N-oleyl-N-(3-trimethoxysilyl)-propyl ammonium chloride.

* * * * *